UNITED STATES PATENT OFFICE.

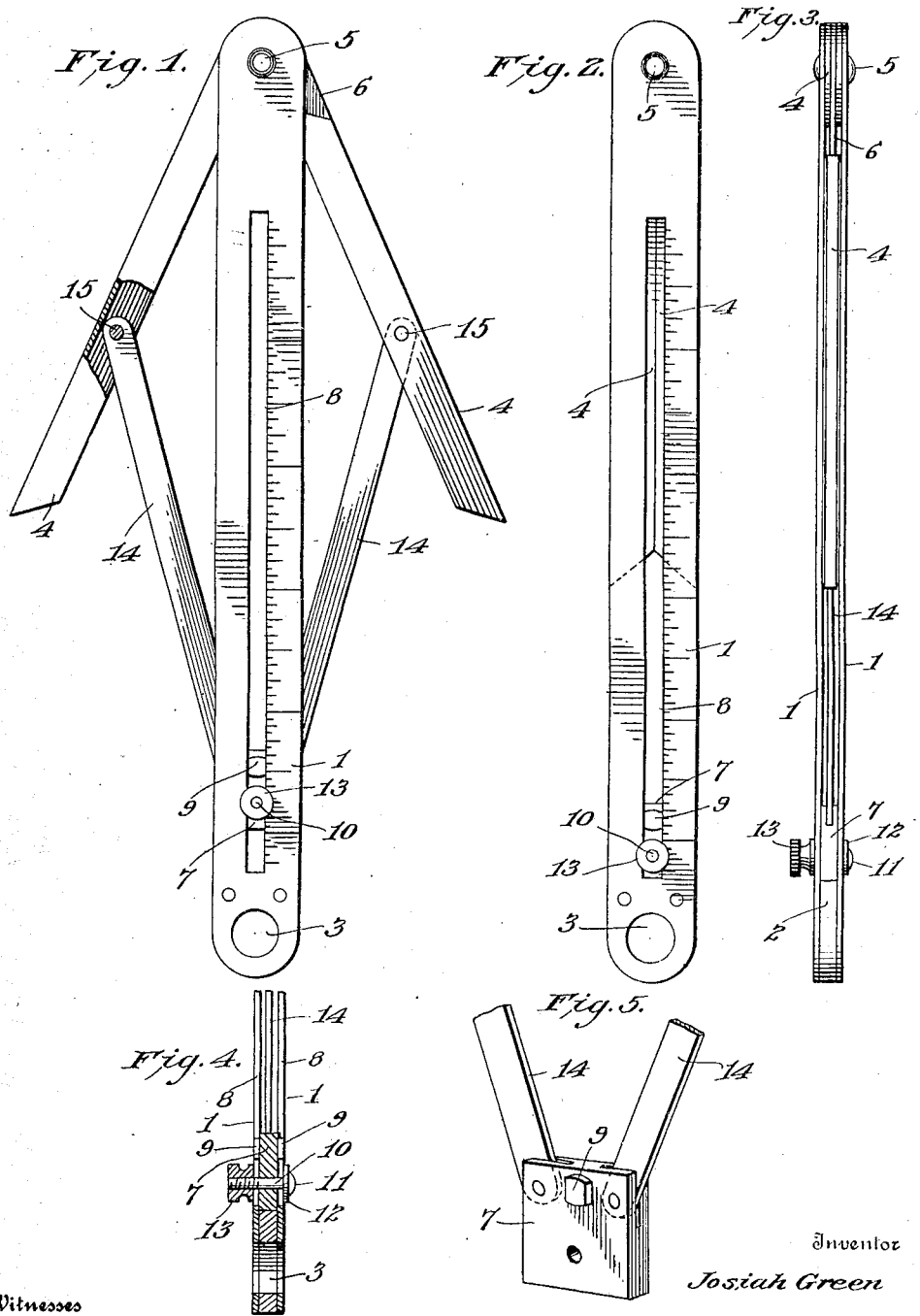

JOSIAH GREEN, OF WILMINGTON, DELAWARE.

MEASURING INSTRUMENT.

No. 925,807.  Specification of Letters Patent.  Patented June 22, 1909.

Application filed December 26, 1908. Serial No. 469,385.

*To all whom it may concern:*

Be it known that I, JOSIAH GREEN, a citizen of the United States, residing at Wilmington, in the county of Newcastle and State of Delaware, have invented certain new and useful Improvements in Measuring Instruments, of which the following is a specification.

My invention relates to an improved measuring instrument, the object of the invention being to provide an improved instrument for measuring angles, and which is also designed as a ruler to mark off the desired angles.
A further object is to provide an improved instrument of this kind, which can measure obtuse and acute angles with equal facility, which can be rigidly secured after obtaining any desired angle, and permit the marking off of said angle on the material to be used, directly from the instrument, without employing additional straight edges.

A further object is to provide improvements of this character, which can be folded into small compass when not in use, and be carried in the pocket ready for instant use when desired.

With these and other objects in view, the invention consists in certain novel features of construction, and combinations, and arrangements of parts as will be more fully hereinafter described and pointed out in the claims.

In the accompanying drawings, Figure 1, is a view in elevation illustrating my improvements. Fig. 2, is a similar view showing the instrument folded. Fig. 3, is an edge view. Fig. 4, is a detail sectional view, and Fig. 5, is a perspective view of the sliding block.

1, 1, represent flat metal bars, disposed parallel to each other, having a spacing block 2 between them, at one end, and rigidly secured to said block, and said bars and the block made with openings 3 to enable the instrument to be hung up out of the way when desired.

Between the bars 1 at the other end of the instrument, arms 4 are pivotally secured upon a hinge pin or rivet 5. These arms 4 are formed by bending a strip of metal longitudinally upon itself as clearly shown in Fig. 3, and one of said arms is longitudinally grooved at its edge to straddle the restricted inner portion 6 of the other arm, and form a neat joint and a sharp angle when the arms are swung to an acute angle with relation to each other.

A sliding block 7 is located between the bars 1 and both of said bars are made with longitudinal slots 8 into which lugs 9 on the opposite faces of the block project, and prevent any turning movement of the block. A screw 10 also projects through the block 7, and has a head 11 at one end, which bears against a washer 12, the latter located against one of the bars 1, and on the other end of the screw a thumb nut 13 is located, and is adapted to clamp against the bar 1 and secure the block against movement. This block is recessed to receive the ends of links 14, the latter pivotally secured at one end in said blocks, and the other end of said links are located within the folded or bent portions of the arms, and pivotally secured by means of rivets 15 passing through the arms and links.

When it is desired to measure an angle, the thumb nut 13 is loosened, and the arms 4 are brought outward, the instrument is then inserted in an angle, until the arms 4 exactly coincide with the walls of the angle when the thumb nut 13 is tightly clamped, the instrument can then be removed and the angle recorded. This is also true in measuring acute angles, as the arms can be swung past the horizontal, and when the angle is secured, the edges of the arms are straight and constitute straight edges to record the angle and enable it to be marked off on the material.

This instrument is especially designed for measuring restricted areas, such as are found in the cabins of boats, where it is difficult to secure the proper angles with instruments heretofore known, and with such instruments it is necessary to employ other forms of straight edges to mark the angles when found.

When the instrument is not in use, the arms can be folded inwardly until the said arms and the links are entirely inclosed between the bars 1, the bent over formation of the arms enables the links to move into the arms, and hence economize space.

A great many slight changes might be made in the general form and arrangement of parts described without departing from my invention, and hence I do not restrict myself to the precise details set forth, but consider myself at liberty to make such changes and alterations as fairly fall within the spirit and scope of my invention.

Having thus described my invention what

I claim as new and desire to secure by Letters Patent is:

1. In an instrument of the character described, the combination with parallel bars, of arms comprising strips of metal bent longitudinally upon themselves, one of said arms bifurcated, a pivot pin passing through the said bars and pivotally securing both of said arms at one end of the said bars, a block mounted to slide between the bars, links pivotally connected to opposite edges of said block and projecting at their ends into the bent over portions of the arms, rivets pivotally securing the arms and links together, and said links adapted to fold within the arms, and the latter adapted to fold between the bars.

2. In an instrument of the character described, the combination with parallel bars, of arms comprising strips of metal bent longitudinally upon themselves, one of said arms bifurcated, a pivot pin passed through said bars and pivotally securing both of said arms at one end of said bars, a block mounted to slide between the bars, and having recessed side edges, links pivotally secured in said recessed edges of the block and projecting at their ends into the bent over portions of the arms, rivets pivotally securing the arms and links together, said links adapted to fold within the arms, and the latter adapted to fold between the bars, said bars having longitudinal slots, lugs on said block movable in said slots, a screw projecting through said slots and block, and a clamping nut on said screw.

In testimony whereof I have signed my name to this specification in the presence of two subscribing witnesses.

JOSIAH GREEN.

Witnesses:
 JAMES GREEN,
 SARAH ANN GREEN.